A. E. RICE.
AGRICULTURAL MACHINE.
APPLICATION FILED APR. 10, 1920.
1,357,902.
Patented Nov. 2, 1920.
2 SHEETS—SHEET 1.
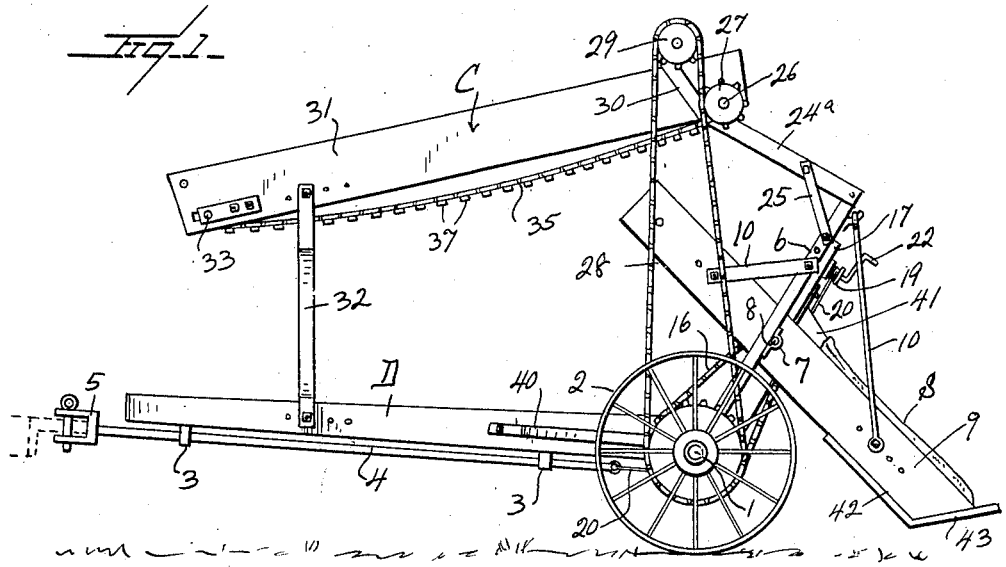
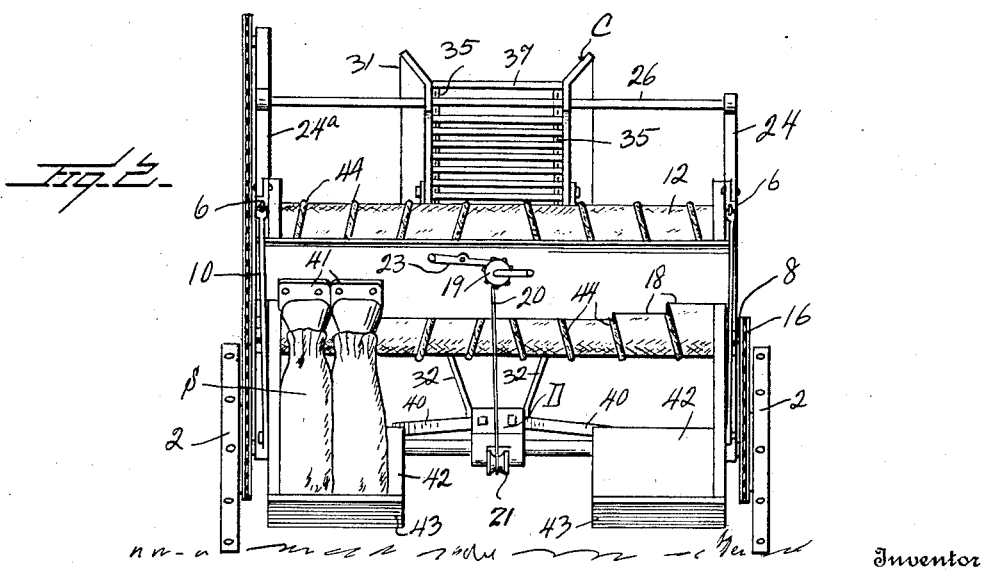
Inventor
A. E. Rice
By Watson E. Coleman
Attorney A. E. RICE.
AGRICULTURAL MACHINE.
APPLICATION FILED APR. 10, 1920.
1,357,902.
Patented Nov. 2, 1920.
2 SHEETS—SHEET 2.
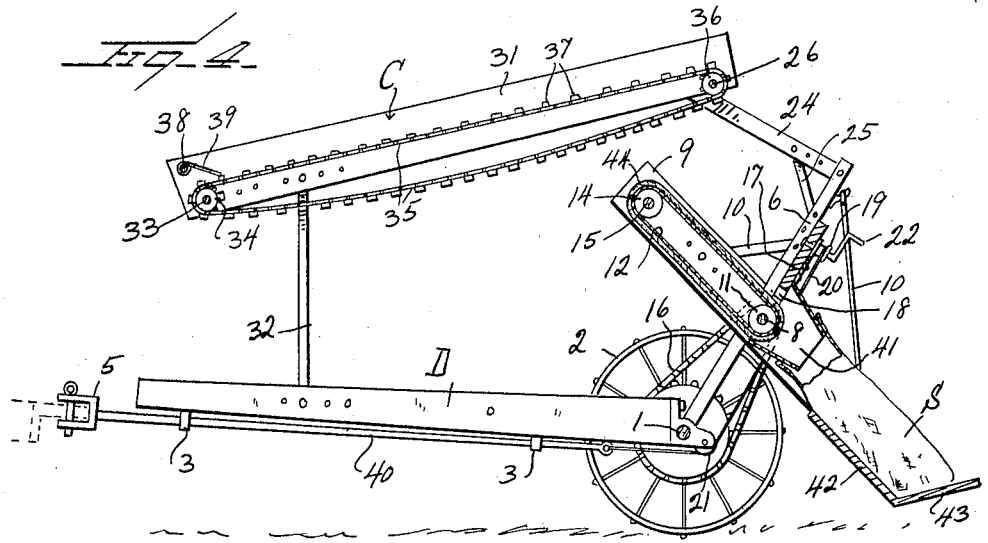
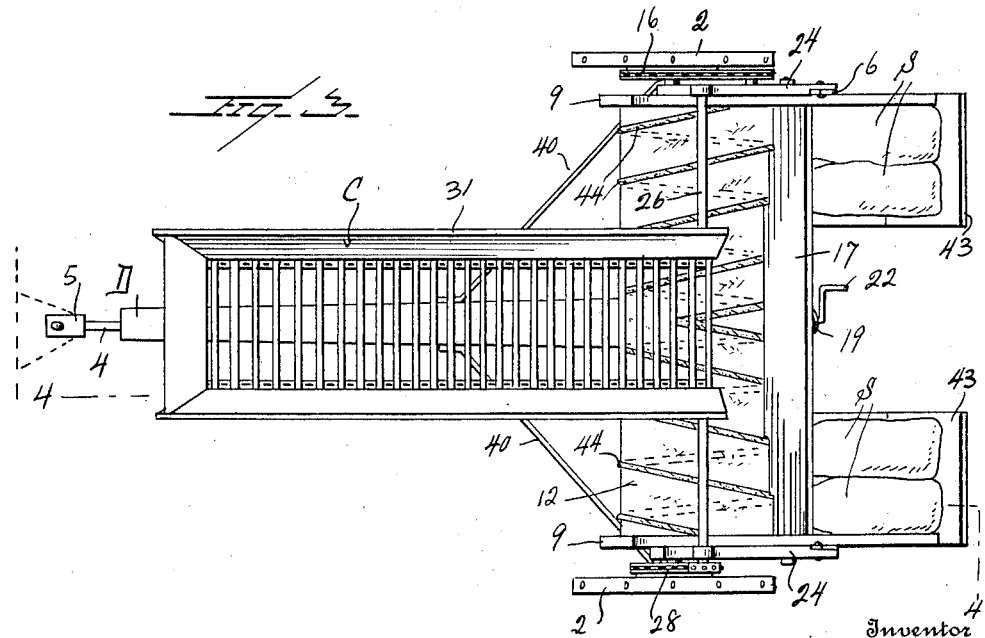
Inventor
A. E. Rice
By Watson E. Coleman
Attorney

UNITED STATES PATENT OFFICE.

ARLO E. RICE, OF AMBOY, MINNESOTA, ASSIGNOR OF ONE-HALF TO WILLIAM GETTY, OF AMBOY, MINNESOTA.

AGRICULTURAL MACHINE.

1,357,902.   Specification of Letters Patent.   Patented Nov. 2, 1920.

Application filed April 10, 1920. Serial No. 372,860.

*To all whom it may concern:*

Be it known that I, ARLO E. RICE, a citizen of the United States, residing at Amboy, in the county of Blue Earth and State of Minnesota, have invented certain new and useful Improvements in Agricultural Machines, of which the following is a specification, reference being had to the accompanying drawings.

This invention relates to certain improvements in agricultural machines, and has relation more particularly to a device of this general character especially designed and adapted for use in connection with potato diggers or kindred machines, and it is an object of the invention to provide a novel and improved machine which operates effectually to separate the collected potatoes or other vegetables from dirt or other foreign matter, to grade the same, and to readily and conveniently effect a sacking thereof.

Another object of the invention is to provide a novel and improved machine of this general character which is adapted to be trailed behind a potato digger or the like or otherwise transported, and which is provided with an endless receiving conveyer mechanism operated as a separating element and which conveyer mechanism discharges upon a grading mechanism.

An additional object of the invention is to provide a novel and improved machine of this general character embodying a grading mechanism including means whereby potatoes or the like are discharged into suitably positioned sacks in accordance with the grade or size thereof.

The invention consists in the details of construction and in the combination and arrangement of the several parts of my improved mechanism whereby certain important advantages are attained and the device rendered simpler, less expensive and otherwise more convenient and advantageous for use, as will hereinafter be more fully set forth.

The novel features of my invention will hereinafter be definitely claimed.

In order that my invention may be the better understood, I will now proceed to describe the same with reference to the accompanying drawings, wherein:—

Figure 1 is a view in side elevation of an agricultural machine constructed in accordance with an embodiment of my invention;

Fig. 2 is a view in rear elevation of the device as illustrated in Fig. 1;

Fig. 3 is a view in top plan of the machine as herein disclosed;

Fig. 4 is a sectional view taken substantially on the line 4—4 of Fig. 3.

As disclosed in the accompanying drawings, 1 denotes a supporting axle having mounted on the opposite end portions thereof the traction wheels 2. The wheels 2 are mounted upon the axle 1 in a manner whereby the same may have differential movement and which is particularly desirable when the machine is being turned. As this construction, however, in itself forms no particular part of my present invention, a detailed description and illustration thereof is believed to be unnecessary.

D denotes a tongue having its rear or butt end portion operatively engaged with the axle 1. Depending from the tongue D are the longitudinally spaced guides 3 through which is loosely directed an elongated draft rod 4. The rod 4 extends forwardly of the tongue D and terminates in a hitch 5 adapted to be coupled in any preferred manner with the rear portion of the potato digger or kindred machine.

Operatively engaged with the opposite end portions of the axle 1 are the lower extremities of the upwardly and rearwardly inclined posts or standards 6 arranged substantially in parallelism. The posts 6 are provided at a desired point intermediate their ends with substantially horizontally alined bearings 7 which rotatably support a transverse shaft 8. The shaft 8 is also directed through the side members 9 comprised in the grading mechanism forming part of my improved invention, and which side members extend a desired distance above and below the shaft 8 and on a downward and rearward incline with respect to the machine proper. Coacting with each of the posts or standards 6 and the adjacent side board 9 above and below said post or standard are the brace members 10 whereby said side boards 9 are effectively held against rotation about the shaft 8. The brace members 10 are adjustably engaged with the coacting side board or member 9 so that the angle of inclination of said side members or boards 9 may be varied as the requirements of practice may prefer.

Fixed to the shaft 8 between the side members or boards 9 and substantially bridging the space therebetween is a drum 11 around which passes an endless apron 12 of a width substantially equal to the distance between the side members or boards 9, and said apron 12 also passes around a drum 14 carried by a shaft 15 rotatably supported by and bridging the space between the side members or boards 9. One end portion of the shaft 8 is in driven connection, through the instrumentality of the sprocket chain 16, with the adjacent wall 2 so that as the machine travels forwardly, the upper stretch of the apron 12 moves upwardly and forwardly.

Secured to the posts or standards 6 are the end portions of a board 17. Said board bridges the space between the posts or standards 6 and has the central part of its lower marginal portion positioned in close proximity to the upper stretch of the apron 12 and adjacent the lower portion thereof. The opposite ends of the lower marginal portion of the board 10 are each cut away to provide the stepped recesses 18 affording discharge openings of different sizes and whereby the requisite grading or sizing of the potatoes or the like is effected.

The upper marginal portion of the board 17 at substantially the longitudinal center thereof rotatively supports a drum or windlass 19 to which is engaged and adapted to be wound a flexible member 20. The member 20 extends downwardly and under a guide pulley 21 carried by the rear portion of the tongue D and extends forwardly and is secured to the rear or inner end portion of the draft rod 4. The drum or pulley 19 is adapted to be rotated by the crank 22 or the like, and said drum or windlass is held against retrograde rotation through the instrumentality of the dog or pawl 23. The flexible member 20 and the drum or windlass 19 provides means whereby my improved machine can be drawn forward toward or permitted to drop back with respect to the hitch 5 or the potato digger or kindred machine to which the same may be attached.

Secured to the upper end portions of the posts or standards 6 are the forwardly and upwardly inclined arms 24 and 24ᵃ and interposed between each of said arms 24 and 24ᵃ and the adjacent post or standard 6 is a brace member 25 whereby said arm 24 or 24ᵃ is rigidly supported in desired position. The angle of the arms 24 and 24ᵃ may be readily adjusted by either lengthening or shortening the brace members 25.

Rotatably supported by the forward end portions of the arms 24 and 24ᵃ is a transversely disposed shaft 26, and one end portion of said shaft 26 is extended outwardly of the adjacent arm 24ᵃ and has fixed thereto a sprocket wheel 27. Engaging the sprocket wheel 27 at the forward side thereof is the inner stretch of a vertically disposed sprocket chain 28. The upper portion of the chain 28 passes over an idle sprocket wheel 29 rotatably supported by a forwardly and upwardly disposed extension 30 of the arm 24ᵃ, while the lower portion of the sprocket chain 28 is operatively engaged with the adjacent traction wheel 2.

C denotes a conveyer mechanism including the side boards or members 31 having their rear end portions operatively engaged with the shaft 26 and their forward end portions supported by the upstanding supporting members 32 carried by the forward portion of the tongue D. The members 32 are each adjustably secured to its coacting side board or member 31 and to the tongue D so that the angle of the conveying mechanism may be regulated as desired.

33 denotes a transversely disposed shaft rotatably supported by the forward or lower end portions of the side boards or members 31 and adjustable longitudinally thereof, and said shaft 33 inwardly of and in close proximity to each of the side boards 31 is provided with a sprocket wheel 34, around which passes a side chain 35. This chain 35 also passes around a sprocket wheel 36 fixed to the shaft 26 in longitudinal alinement with the sprocket wheel 34. The side chains 35 are connected by the crossed cleats or slats 37 with adjacent cleats or slots in relatively close proximity one to the other. The rotation of the shaft 26 is such as to cause the upper stretches of the chains 35 to move upwardly and rearwardly and the cleats or slats 37, in addition to assuring the requisite conveyance of the potatoes or the like discharged thereupon, provide means whereby dirt or the like is effectually separated from the potatoes.

The forward or lower end portions of the side members or boards 31 adjacent the upper margins thereof are connected with a transversely disposed rod 38 with which is engaged an inwardly disposed and downwardly inclined gate 39 having free swinging movement in a vertical path, and which gate serves as a means to prevent the potatoes or the like from rolling off at the forward or lower end portion of the conveyer mechanism.

In order to impart greater rigidity and strength to my improved machine, I find it of advantage to interpose between the tongue D at a desired point in advance of the axle 1 and the opposite end portions of the axle A the brace irons 40.

Secured to the rear face of the board 17 at each end thereof and coacting with each of the stepped openings is a rearwardly and downwardly directed chute 41 which also serves as a sack holder and is adapted to be engaged within the upper or open end of a sack S, as is particularly illustrated in Figs. 2 and 4. The lower portion of each of the sacks S is adapted to rest upon a holding platform 42 suitably secured to the bottom edges of the side members or boards 9 at the lower or rear portions thereof, and each of said platforms 42 has its lower portion continued by a rearwardly and angularly disposed extension 43 on which the bottoms of the sacks directly rest.

Suitably secured to the outer face of the apron 12 are the spirally arranged ribs 44 disposed in opposite directions from substantially the transverse center of the machine, and which ribs preferably comprise rope or other cordage. By this means, as the apron 12 travels, the potatoes or the like discharged upon the upper stretch thereof are moved in opposite directions along the board 17 until the same come to the stepped openings 18 and through which the same discharge in accordance with their grade or size.

In practice my improved machine is adapted to trail behind a potato digger of the standard four-horse type, and as the potatoes are discharged from said digger they fall upon the conveyer mechanism C. The potatoes are then carried upwardly and rearwardly by the mechanism C and discharged upon the apron 12, as just explained. The apron 12, through the instrumentality of the ribs 44, spreads the potatoes in opposite directions along the board 17 so that the same will be readily carried to the stepped openings 18. As the potatoes pass through the openings 18, they are collected within the sacks S suitably engaged with the chutes 41. The operator walks between the platforms 42, and said platforms, as is particularly illustrated in Fig. 2, are spaced apart transversely of the machine. By this means, the operator has complete control of the machine.

From the foregoing description, it is thought to be obvious that a mechanism constructed in accordance with my invention is particularly well adapted for use by reason of the convenience and facility with which it may be assembled and operated, and it will also be obvious that my invention is susceptible of some change and modification without departing from the principles and spirit thereof, and for this reason I do not wish to be understood as limiting myself to the precise arrangement and formation of the several parts herein shown in carrying out my invention in practice except as hereinafter claimed.

I claim:—

1. A machine of the class described including a substantially horizontally disposed member provided with longitudinally spaced grading openings, means for moving the articles to be graded longitudinally of the member and in reverse directions, said means constituting a movable bottom, and feeding means delivering to said bottom at the central portion of the member.

2. A machine of the class described including a substantially horizontally disposed member provided with longitudinally spaced grading openings, means for moving the articles to be grated longitudinally of the member and in reverse directions from substantially the longitudinal center of the member, said means constituting a movable bottom, and feeding means delivering to said bottom at the central portion of the member.

3. A machine of the class described including a substantially horizontally disposed member provided with longitudinally spaced grading openings, and means for moving the articles to be graded longitudinally of the member and in reverse directions, said means comprising an endless apron provided with outstanding, spiral ribs, said apron constituting a movable bottom and extending upwardly from and to one side of the member.

4. A machine of the class described including a substantially horizontally disposed member provided with longitudinally spaced grading openings, and means for moving the articles to be graded longitudinally of the member and in reverse directions, said means comprising an endless apron provided with outstanding, spiral ribs, said ribs being reversely directed from a point substantially midway of the member, said apron constituting a movable bottom and extending upwardly from and to one side of the member.

5. A machine of the class described comprising a substantially horizontally disposed member provided with longitudinally spaced grading openings, and means for moving the articles to be graded longitudinally of the member and in reverse directions, said means comprising an endless apron provided with outstanding, spiral ribs, and means for operating the apron with the upper stretch moving in a direction away from the member, said apron constituting a movable bottom and extending upwardly from and to one side of the member.

6. A machine of the class described comprising a grading mechanism, said mechanism including a member disposed transversely of the direction of travel of the machine and provided with grading openings, means for moving the articles to be separated along said member in opposite directions, and a conveyer delivering to the grading mechanism, said conveyer operating as a separator, said conveyer being disposed on a downward incline in a direction from the member, the high end of the conveyer constituting the discharge end.

7. A machine of the class described comprising a grading mechanism, said mechanism including a member disposed transversely of the direction of travel of the machine and provided with grading openings, and means for moving the articles to be separated along said member in opposite directions, and a conveyer delivering to the grading mechanism at the central portion of the member.

8. A machine of the class described comprising a grading mechanism, said mechanism including a member disposed transversely of the direction of travel of the machine and provided with grading openings, means for moving the articles to be separated along said member in opposite directions, and a conveyer delivering to the grading mechanism at the central portion of the member, said conveyer operating as a separator.

9. A machine of the class described comprising a supporting structure, a grading mechanism carried thereby and including side members supported intermediate their lengths by the structure for swinging movement in a vertical path, means for holding said side members in different positions about their pivots, a transverse member interposed between said side members and provided with longitudinally spaced grading openings, an endless apron supported between the side members above the transverse member and traveling in a direction longitudinally of the side members, the upper stretch of the endless apron traveling in a direction away from the transverse member, and means for imparting movement to the endless apron, said apron being provided with means for moving articles deposited thereon in a direction lengthwise of the transverse member.

10. A machine of the class described comprising a supporting structure, a grading mechanism carried thereby and including side members supported intermediate their lengths by the structure for swinging movement in a vertical path, means for holding said side members in different positions about their pivots, a transverse member interposed between said side members and provided with longitudinally spaced grading openings, an endless apron supported between the side members above the transverse member and traveling in a direction longitudinally of the side members, the upper stretch of the endless apron traveling in a direction away from the transverse member, means for imparting movement to the endless apron, said apron being provided with means for moving articles deposited thereon in a direction lengthwise of the transverse member, and a separating conveyer carried by the structure and discharging upon the apron at the central portion of the transverse member.

In testimony whereof I hereunto affix my signature.

ARLO E. RICE.